United States Patent
Hesse

(10) Patent No.: US 10,649,932 B2
(45) Date of Patent: May 12, 2020

(54) SAFETY-ORIENTED ELECTRICAL CONTROLLER AND CONTROLLER SYSTEM

(71) Applicant: Lenze Automation GmbH, Aerzen (DE)

(72) Inventor: Peter Hesse, Hameln (DE)

(73) Assignee: Lenze Automation GmbH, Aerzen (DE)

( * ) Notice: Subject to any disclaimer, the term of this patent is extended or adjusted under 35 U.S.C. 154(b) by 0 days.

(21) Appl. No.: 16/389,060

(22) Filed: Apr. 19, 2019

(65) Prior Publication Data

US 2019/0324931 A1 Oct. 24, 2019

(30) Foreign Application Priority Data

Apr. 20, 2018 (DE) .......... 10 2018 206 109

(51) Int. Cl.
*G06F 13/20* (2006.01)
*G05B 19/406* (2006.01)
*G05B 19/05* (2006.01)

(52) U.S. Cl.
CPC .......... *G06F 13/20* (2013.01); *G05B 19/058* (2013.01); *G05B 19/406* (2013.01); *G05B 2219/50193* (2013.01); *G06F 2213/38* (2013.01)

(58) Field of Classification Search
None
See application file for complete search history.

(56) References Cited

U.S. PATENT DOCUMENTS

| | | | | |
|---|---|---|---|---|
| 6,975,966 B2* | 12/2005 | Scott | .................... | G05B 23/027 700/4 |
| 7,143,301 B2* | 11/2006 | Pearce | .................. | H04J 3/0682 713/401 |
| 7,237,109 B2* | 6/2007 | Scott | .................... | G05B 19/042 713/164 |
| 7,330,768 B2* | 2/2008 | Scott | .................. | G05B 23/0213 700/21 |
| 7,870,299 B1* | 1/2011 | Sorensen | ............ | G06F 11/1004 710/2 |
| 7,911,333 B2* | 3/2011 | Bussert | .................... | G05B 9/03 340/507 |

(Continued)

FOREIGN PATENT DOCUMENTS

DE 10 2011 088 236 A1 6/2013
EP 2 575 282 A1 4/2013

OTHER PUBLICATIONS

'TwinCAT Safety PLC—PC based Safety Controller' version 1.2.0, Beckhoff, Jun. 29, 2017. (Year: 2017).*

(Continued)

*Primary Examiner* — Steven G Snyder
(74) *Attorney, Agent, or Firm* — Crowell & Moring LLP

(57) ABSTRACT

An electrical controller includes a first interface via which data are able to be transferred, a second interface, separate from the first interface, via which data are able to be transferred, a control unit, and an operating mode memory for storing operating mode information. The control unit is configured to operate the controller in a first safety-oriented operating mode or in a second safety-oriented operating mode depending on the stored operating mode information.

9 Claims, 1 Drawing Sheet

(56) References Cited

U.S. PATENT DOCUMENTS

| | | | | |
|---|---|---|---|---|
| 7,912,990 B2* | 3/2011 | Schlette | G06F 11/0796 |
| | | | 710/10 |
| 8,065,455 B2* | 11/2011 | Hilscher | H04L 12/407 |
| | | | 710/104 |
| 8,977,928 B2 | 3/2015 | Premke et al. | |
| 9,709,963 B2* | 7/2017 | Schmidt | G05B 19/048 |
| 9,734,114 B2* | 8/2017 | Gehrke | H04L 12/40032 |
| 9,806,647 B2* | 10/2017 | Prussmeier | H02P 6/12 |
| 10,216,152 B2* | 2/2019 | Keutner | G05B 9/02 |
| 10,228,675 B2* | 3/2019 | Ueda | G05B 19/4184 |
| 2004/0148130 A1* | 7/2004 | Scott | G05B 23/027 |
| | | | 702/183 |
| 2004/0148513 A1* | 7/2004 | Scott | G05B 19/042 |
| | | | 726/26 |
| 2004/0260408 A1* | 12/2004 | Scott | G05B 23/0213 |
| | | | 700/20 |
| 2005/0249112 A1* | 11/2005 | Barthel | G05B 19/042 |
| | | | 370/216 |
| 2005/0256939 A1* | 11/2005 | Naismith | G05B 19/0426 |
| | | | 709/219 |
| 2006/0253277 A1* | 11/2006 | Behringer | G05B 19/045 |
| | | | 704/203 |
| 2009/0072986 A1* | 3/2009 | Bussert | G05B 9/03 |
| | | | 340/679 |
| 2009/0119437 A1* | 5/2009 | Hilscher | H04L 12/407 |
| | | | 710/305 |
| 2009/0125760 A1* | 5/2009 | Schlette | G06F 11/0796 |
| | | | 714/718 |
| 2015/0045915 A1* | 2/2015 | Schmidt | G05B 19/048 |
| | | | 700/79 |
| 2015/0169493 A1* | 6/2015 | Gehrke | H04L 12/40032 |
| | | | 710/313 |
| 2016/0241173 A1* | 8/2016 | Prussmeier | H02P 6/12 |
| 2017/0075336 A1* | 3/2017 | Ueda | G05B 19/4184 |
| 2017/0329321 A1* | 11/2017 | Dai | B25J 9/1674 |
| 2018/0217914 A1* | 8/2018 | Sawada | G06F 11/3006 |
| 2018/0259954 A1* | 9/2018 | Schwarz | G05D 1/028 |
| 2018/0276169 A1* | 9/2018 | Hansing | H04L 12/40078 |
| 2018/0373213 A1* | 12/2018 | Rose | G05B 19/0425 |
| 2019/0084157 A1* | 3/2019 | Goerg | B25J 9/1612 |
| 2019/0109726 A1* | 4/2019 | Pohl | G05B 9/02 |
| 2019/0265675 A1* | 8/2019 | Zutz | G05B 19/4083 |

OTHER PUBLICATIONS

'XS/SC26-2 Safety Controller Instruction Manual' by Banner, Rev. K, Jun. 10, 2015. (Year: 2015).*
'PROFIsafe System Description Technology and Application' copyright by PROFIBUS Nutzerorganisation e.V. 2010. (Year: 2010).*
'User's manual FSO-21 safety functions module' copyright 2017, ABB. (Year: 2017).*

* cited by examiner

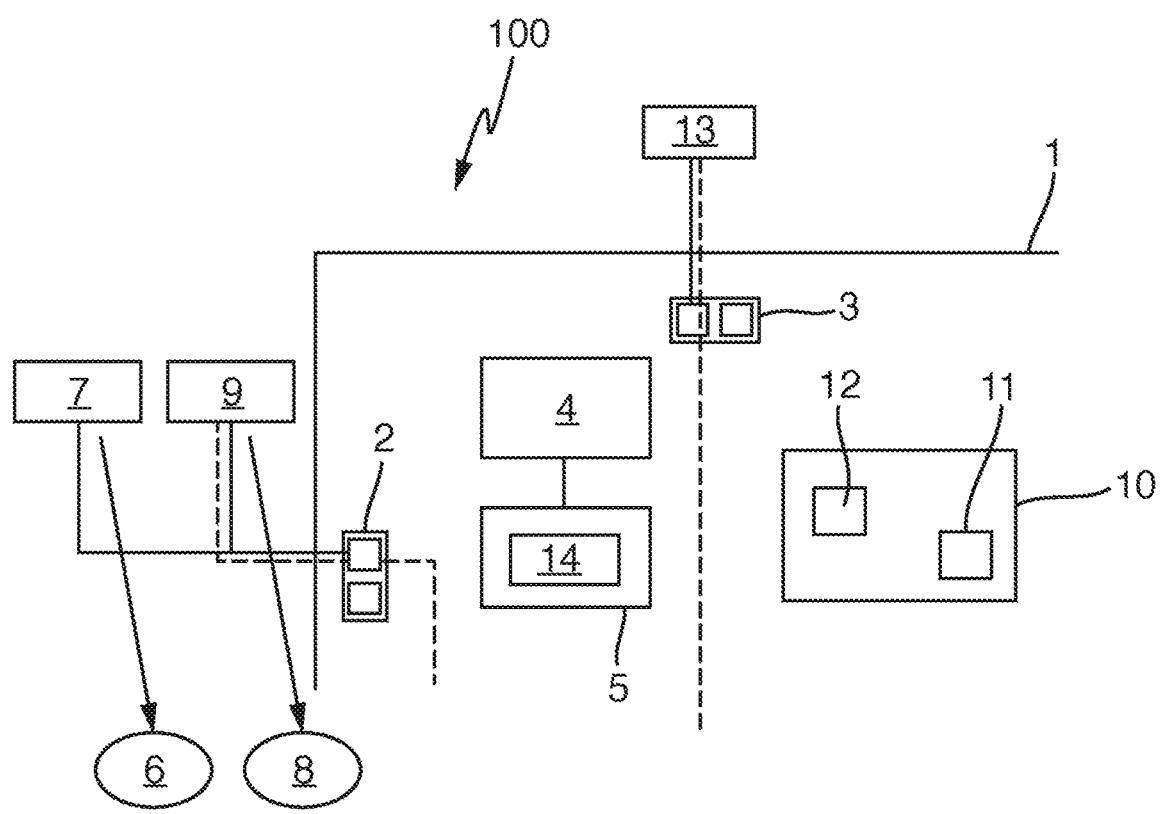

SAFETY-ORIENTED ELECTRICAL CONTROLLER AND CONTROLLER SYSTEM

BACKGROUND AND SUMMARY OF THE INVENTION

The invention relates to an electrical controller and to a controller system having such a controller.

The invention is based on the object of providing an electrical controller and a controller system that enable a safety-oriented data transfer that is as flexible as possible.

The invention achieves this object by way of an electrical controller having a first interface via which data are able to be transferred; a second interface, separate from the first interface, via which data are able to be transferred; a control unit; and an operating mode memory for storing operating mode information, the control unit being configured to operate the controller in a first safety-oriented operating mode or in a second safety-oriented operating mode depending on the stored operating mode information. The invention further achieves this object by way of a controller system having said electrical controller and one or more of a motion controller, a programmable logic controller, and a safety controller.

The electrical controller has a first (field bus) interface via which data are able to be transferred bidirectionally.

The electrical controller furthermore has a second (field bus) interface, separate from the first interface, via which data are able to be transferred bidirectionally, independently from the first interface.

The electrical controller furthermore has a control unit, for example in the form of a microprocessor and associated program memory.

The electrical controller furthermore has an operating mode memory for storing operating mode information. The operating mode memory may be for example a nonvolatile memory, for example a flash memory. The operating mode information may be stored as a binary value at a predefined memory location of the operating mode memory.

The control unit is designed to operate the electrical controller in a first safety-oriented operating mode or in a second safety-oriented operating mode depending on the stored operating mode information. With regard to the basics of safety-oriented operating modes, reference is made to the relevant specialist literature. It is understood that the control unit may be designed to operate the electrical controller in a first safety-oriented operating mode, in a second safety-oriented operating mode or in a further (third, fourth, etc.) safety-oriented operating mode depending on the stored operating mode information. In other words, it is possible to switch between more than two different safety-oriented operating modes. To this end, the electrical controller may also have more than two different interfaces.

According to one embodiment, the control unit in the first safety-oriented operating mode is designed to perform a safety-oriented data transfer, in particular exclusively, via the first interface.

According to one embodiment, the control unit in the first safety-oriented operating mode is designed to receive and to store a parameter set from a motion controller, which is in particular designed so as to be separate from the electrical controller, via the first interface, to receive a Cyclic Redundancy Check (CRC) code, dependent on the parameter set, from a safety controller, which is designed in particular so as to be separate from the electrical controller and the motion controller, via the first interface, to check whether the received CRC code corresponds to the received parameter set or is able to be calculated from the received parameter set using an algorithm, and to control the operation of the controller depending on the received parameter set if the received CRC code corresponds to the received parameter set. Error processing may otherwise be performed.

The first safety-oriented operating mode may be used for example together with what is known as controller-based automation, which is based on central motion tracking that is predefined by way of the motion controller.

According to one embodiment, the control unit in the second operating mode is designed to perform a safety-oriented data transfer via the first interface and/or via the second interface.

According to one embodiment, the electrical controller has a storage medium. The control unit in the second operating mode is designed to read a parameter set stored on the storage medium, to read a CRC code, dependent on the parameter set, from the storage medium, to check whether the read CRC code corresponds to the read parameter set, and to control the operation of the controller depending on the parameter set if the read CRC code corresponds to the read parameter set. Error processing may otherwise be performed.

According to one embodiment, the first interface is an EtherCAT interface. The safety-oriented data transfer via the first interface may be based on the FSoE (Fail Safe over EtherCAT) protocol.

According to one embodiment, the second interface is an EtherCAT interface or a Profinet interface. The safety-oriented data transfer via the second interface may be based on the FSoE protocol or based on the PROFIsafe protocol.

The controller system has an electrical controller described above, and/or a motion controller, and/or a programmable logic controller (PLC), and/or a safety controller.

The prior art discloses what are known as safety communication paths (for example FSoE over EtherCAT, PROFIsafe over ProfiNet, etc.), a particular type of safety communication path being fixedly assigned to a controller in the prior art. If the type of safety communication path of the controller is intended to be changed, it is generally necessary to perform a hardware adjustment, for example by exchanging an interface card in the controller.

According to the invention, it is now possible, by way of a purely software-based setting in the controller, to switch between various communication paths, including the respective safety communication. By way of example, it is possible to switch between a safety-oriented communication based on what is known as a controller-based topology and a safety-oriented communication based on what is known as a drive-based topology, without it being necessary to change the hardware.

If for example a controller-based topology is set by way of the operating mode information stored in the operating mode memory, the safety-oriented protocol FSoE may be set via a system bus of the controller. A motion controller transfers a safe parameter set to the controller at the beginning. A safety controller then transmits a CRC of this safe parameter set to the controller in order to confirm and to validate the safe parameter set in the controller.

If for example a drive-based topology is set by way of the operating mode information stored in the operating mode memory, the safety-oriented protocol FSoE or PROFIsafe may be routed via the field bus. A safety-oriented programmable logic controller via field bus is also necessary in the system, for example a safe Siemens controller. The safe parameter set and the associated CRC for validating the safe parameter set are in this case stored on one or more storage media of the controller.

By way of the parameter set, it is possible for example to set general safety functions, such as for example SLS (safely limited speed), SS1 (safe speed 1), safe encoder settings, safe addresses, etc.

The invention is described in detail below with reference to the drawings.

BRIEF DESCRIPTION OF THE DRAWING

FIG. 1 shows, highly schematically, a controller system according to the invention.

DETAILED DESCRIPTION OF THE DRAWING

FIG. 1 shows, highly schematically, a controller system 100 having an electrical controller 1, a motion controller 7, a safety controller 9 and a programmable logic controller 13.

The electrical controller 1 has an EtherCAT interface 2. With regard to the basic functions of such an interface, reference is made to the relevant specialist literature. The controller 1 is connected to a motion controller 7 and to a safety controller 9 for data exchange purposes via the EtherCAT interface 2.

The electrical controller 1 furthermore has a Profinet interface 3. With regard to the basic functions of such an interface, reference is also made to the relevant specialist literature. The controller 1 is connected to the programmable logic controller 13 for data exchange purposes via the Profinet interface 3.

The electrical controller 1 furthermore has a microprocessor-based control unit 4.

The electrical controller 1 furthermore has a nonvolatile operating mode memory 5 for storing operating mode information 14. The control unit 4 operates the electrical controller 1 in a first safety-oriented operating mode or in a second safety-oriented operating mode depending on the stored operating mode information 14.

The electrical controller 1 furthermore has a storage medium 10, whose functions are described in even more detail below. The storage medium 10 and the operating mode memory 5 may be formed by a common electrical nonvolatile memory, for example a flash memory.

The control unit 4 performs a safety-oriented data transfer via the first interface 2, based on the FSoE protocol, in the first safety-oriented operating mode.

In the first safety-oriented operating mode, the control unit 4 receives a parameter set 6 from the motion controller 7 via the first interface 2 and stores this parameter set in the memory 10. The control unit 4 receives a CRC code 8 derived from the parameter set from the security controller 9 via the first interface 2. The control unit 4 then checks whether the received CRC code 8 corresponds to the received parameter set 6. If this is the case, the control unit 4 controls the operation of the controller 1 depending on the received parameter set 6. Error processing is otherwise performed.

In the second operating mode, the control unit 4 performs a safety-oriented data transfer via the second interface 3, based on the PROFIsafe protocol.

In the second operating mode, the control unit 4 reads a parameter set 11 stored on the storage medium 10. The control unit 4 furthermore reads a CRC code 12 stored on the storage medium 10 and derived from the parameter set 11. The control unit 4 then checks whether the read CRC code 12 corresponds to the read parameter set 11. If this is the case, the control unit 4 controls the operation of the controller 1 depending on the parameter set 11. Error processing is otherwise performed.

By way of the parameter set 6 or 11, it is possible for example to set general safety functions, such as for example SLS (safely limited speed), SS1 (safe speed 1), safe encoder settings, safe addresses, etc.

What is claimed is:

1. An electrical controller, comprising:
a first interface via which data are able to be transferred;
a second interface, separate from the first interface, via which data are able to be transferred;
a control unit; and
an operating mode memory for storing operating mode information, the control unit being configured to operate the electrical controller in a first safety-oriented operating mode or in a second safety-oriented operating mode depending on the stored operating mode information, wherein
the control unit in the first safety-oriented operating mode is configured to:
  receive and store a parameter set from a motion controller via the first interface,
  receive a Cyclic Redundancy Check (CRC) code, dependent on the parameter set, from a safety controller via the first interface,
  check whether the received CRC code corresponds to the received parameter set, and
  control the operation of the electrical controller depending on the received parameter set if the received CRC code corresponds to the received parameter set.

2. The electrical controller according to claim 1, wherein the control unit in the first safety-oriented operating mode is configured to perform a safety-oriented data transfer via the first interface.

3. The electrical controller according to claim 1, wherein the control unit in the second operating mode is configured to perform a safety-oriented data transfer via the first interface and/or via the second interface.

4. The electrical controller according to claim 1, wherein the controller has a storage medium,
the control unit in the second operating mode is configured to:
  read a parameter set stored on the storage medium,
  read a CRC code, dependent on the stored parameter set, from the storage medium,
  check whether the read CRC code corresponds to the read parameter set, and
  control the operation of the controller depending on the parameter set if the read CRC code corresponds to the read parameter set.

5. The electrical controller according to claim 1, wherein the first interface is an EtherCAT interface.

6. The electrical controller according to claim 5, wherein the safety-oriented data transfer via the first interface is based on the Fail Safe over EtherCAT (FSoE) protocol.

7. The electrical controller according to claim 5, wherein the second interface is an EtherCAT interface or a Profinet interface.

8. The electrical controller according to claim 7, wherein the safety-oriented data transfer via the second interface is based on the Fail Safe over EtherCAT (FSoE) protocol or based on the PROFIsafe protocol.

9. A controller system, comprising:
an electrical controller according to claim 1; and one or more of a motion controller, a programmable logic controller, and a safety controller.

* * * * *